May 12, 1931.  S. M. FAIRCHILD  1,804,680
FILM CHANGING AND POSITIONING DEVICE FOR CAMERAS
Original Filed March 1, 1923  6 Sheets-Sheet 1

Inventor
S. M. Fairchild
By his Attorneys
Cooper, Kerr & Dunham

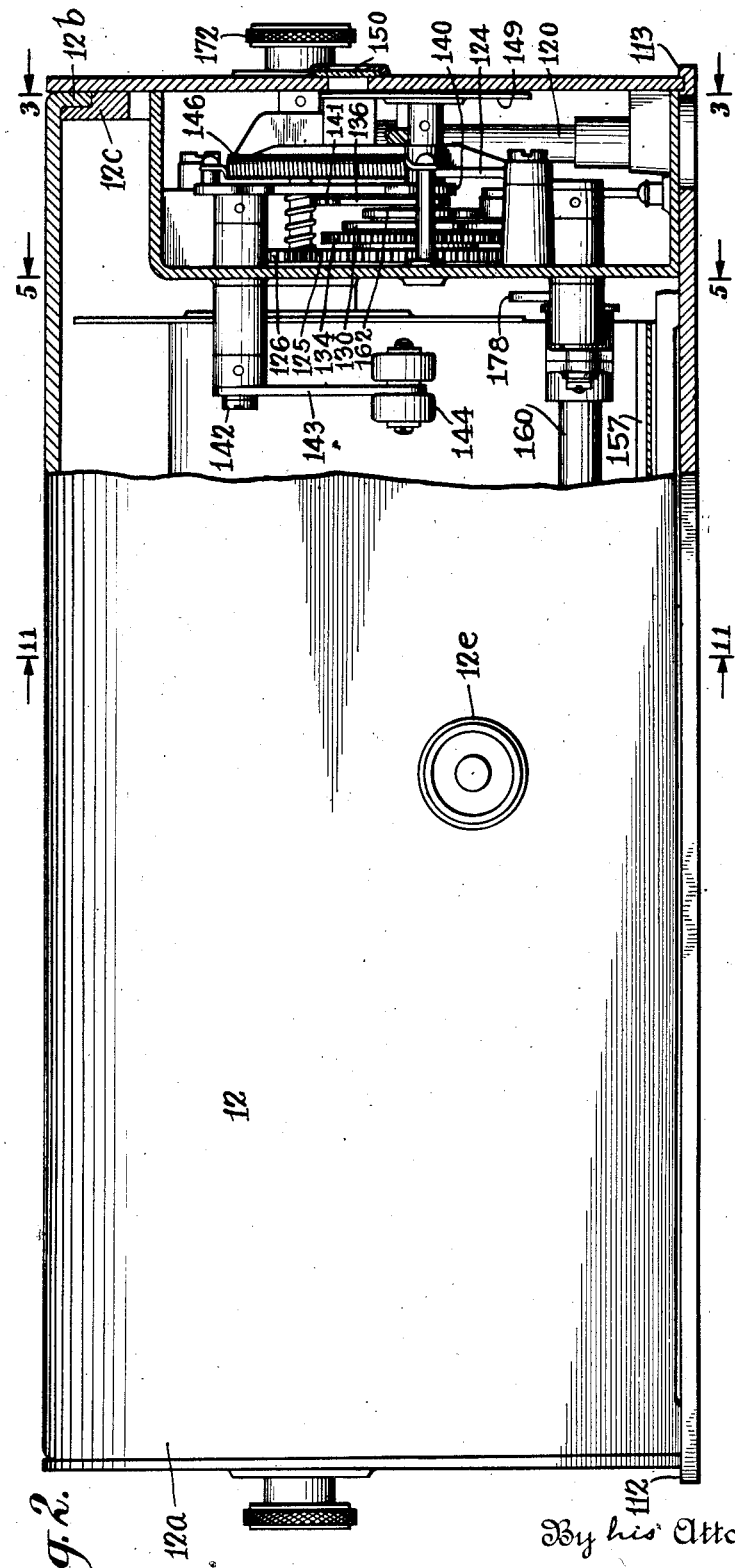
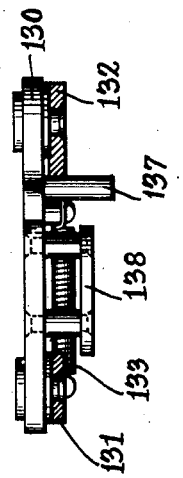
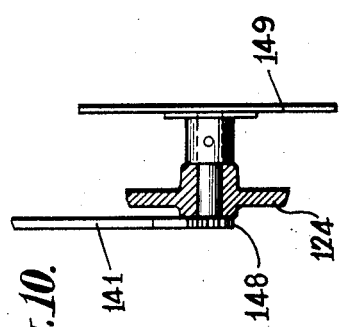

May 12, 1931.  S. M. FAIRCHILD  1,804,680
FILM CHANGING AND POSITIONING DEVICE FOR CAMERAS
Original Filed March 1, 1923   6 Sheets-Sheet 3

Inventor
S. M. Fairchild
By his Attorneys
Cooper, Kerr & Dunham

May 12, 1931. S. M. FAIRCHILD 1,804,680
FILM CHANGING AND POSITIONING DEVICE FOR CAMERAS
Original Filed March 1, 1923 6 Sheets-Sheet 4
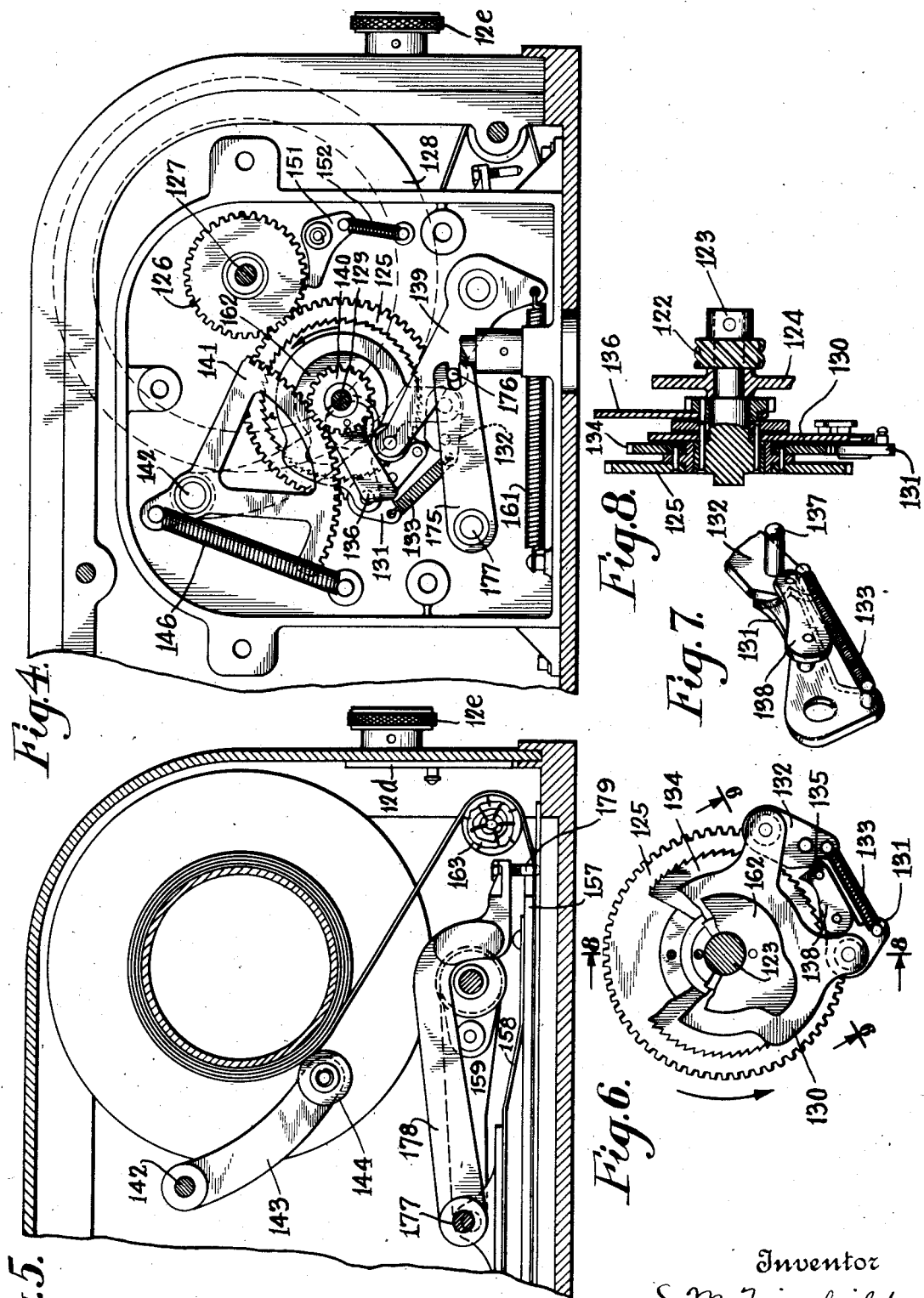
Inventor
S. M. Fairchild
By his Attorneys
Cooper, Kerr & Dunham May 12, 1931.　　　　S. M. FAIRCHILD　　　　1,804,680
FILM CHANGING AND POSITIONING DEVICE FOR CAMERAS
Original Filed March 1, 1923　　6 Sheets-Sheet 6

Inventor
S. M. Fairchild
By his Attorneys
Cooper, Kerr & Dunham

Patented May 12, 1931

1,804,680

UNITED STATES PATENT OFFICE

SHERMAN M. FAIRCHILD, OF NEW YORK, N. Y.

FILM-CHANGING AND POSITIONING DEVICE FOR CAMERAS

Original application filed March 1, 1923, Serial No. 622,032. Divided and this application filed December 23, 1926. Serial No. 156,560.

The invention which forms the subject of my present application (a division of my co-pending application Serial No. 622,032, filed March 1, 1923, now patented on January 4, 1927, Patent Number 1,612,860) relates to film-changing and positioning devices for cameras, more especially "aerial" cameras, and its chief object is to provide devices which are efficient and convenient and withal reliable in operation. To this and other ends the invention comprises the novel features and combinations hereinafter described.

One form of the invention is illustrated in the accompanying drawings, in which

Fig. 2 is a side view of the magazine with part of its casing broken away to show portions of the interior mechanism for spacing and positioning the film.

Fig. 4 is a sectional view similar to Fig. 3 but showing the parts in a different operative positon.

Fig. 5 is a section on line 5—5 of Fig. 2.

Fig. 6 is a detail view, in elevation, with parts broken away, of certain elements shown in Figs. 3 and 4.

Fig. 7 is a detail perspective view of certain parts shown in Fig. 6.

Figs. 8 and 9 (the latter on the same sheet as Fig. 2) are sections on lines 8—8 and 9—9, respectively, of Fig. 6.

Fig. 10 (on the same sheet as Fig. 2) is a side view of the film indicator.

Figure 11:
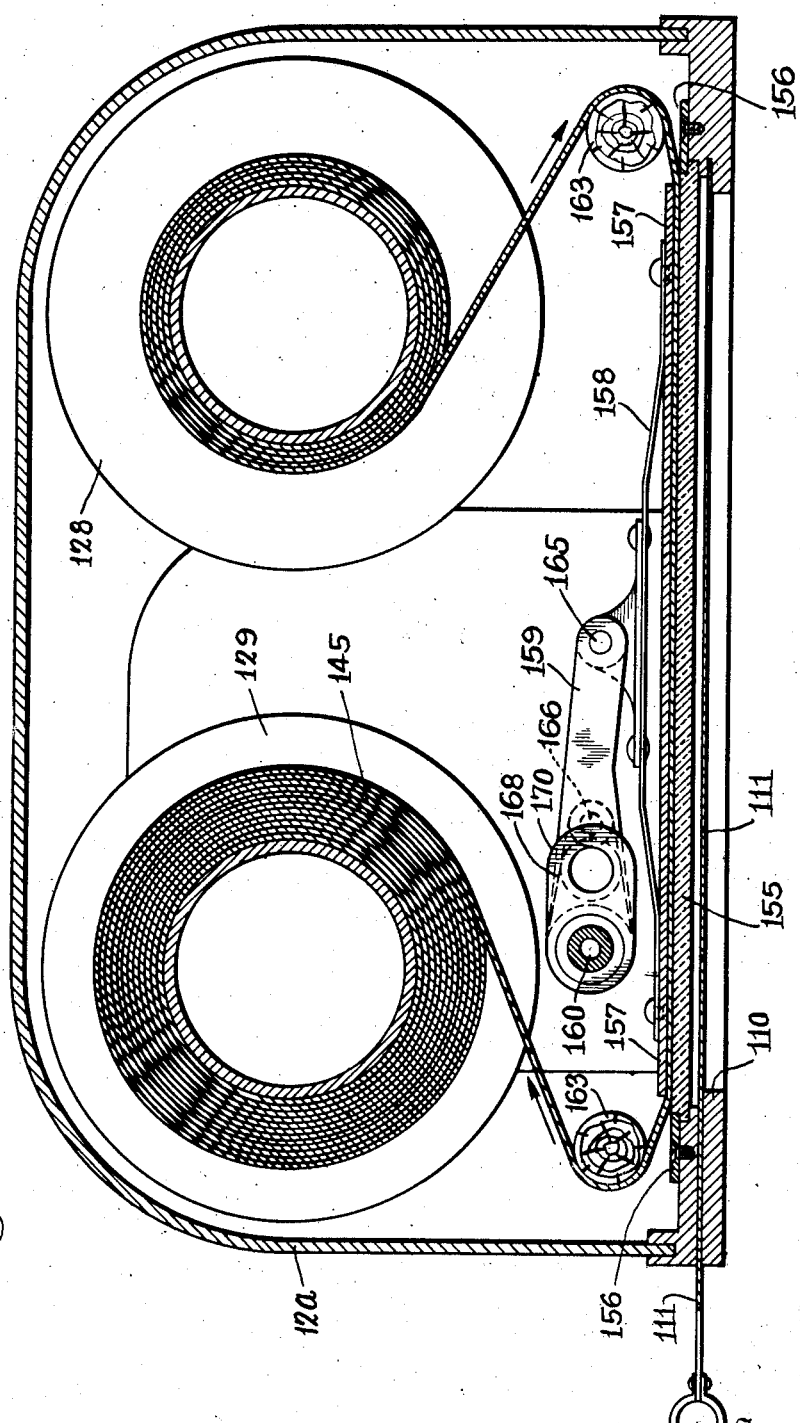
Figure 12:
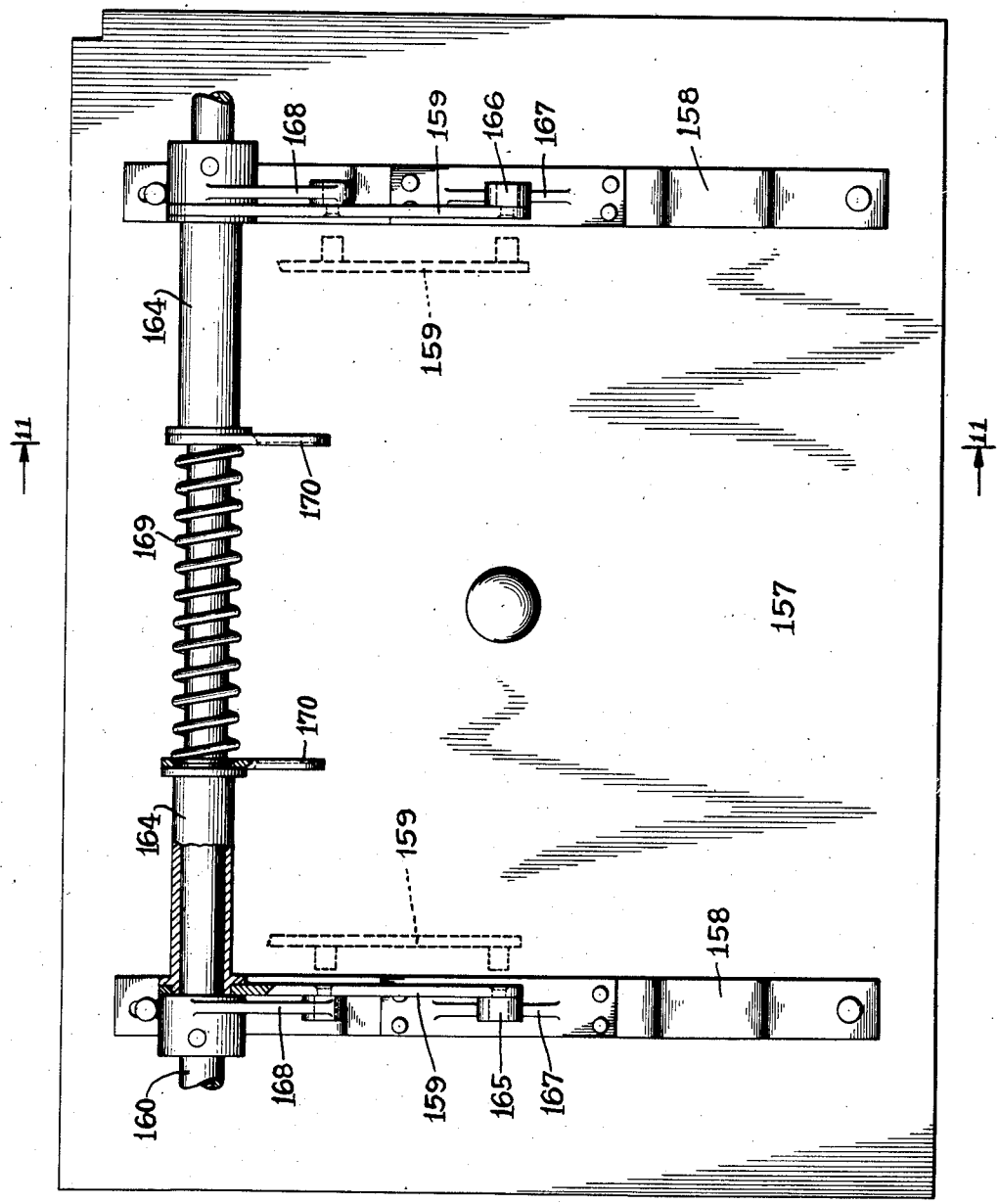

Fig. 11 is a cross-section of the magazine, on line 11—11 of Figs. 2 and 12.

Fig. 12 is a plan view of the film-positioning or pressure plate and its actuating devices.

In the construction shown, the camera comprises a camera-body 10, housing a driving mechanism and carrying the driving motor, not shown; a magazine 12, housing the sensitive film or plates, as the case may be; and a lens cone 13, housing the lens and shutter. These three parts, the camera body, the magazine, and the lens cone, are separable from each other, and constitute what may for convenience be termed separable camera units. The support or mounting for the camera, not shown, is preferably of the gimbal type, as for example that described in my prior application Serial No. 595,046, now Patent No. 1,517,550, issued December 2, 1924, to which reference may be had for detailed description. It is deemed sufficient here to say that the camera is pivoted (at diametrically opposite points) by means of brackets 14 to an inner gimbal ring, not shown, which ring is itself pivoted (at the ends of a diameter at right angles to and in the plane of the axis of the camera pivots 21) on an outer ring, also not shown. The camera pivots are preferably carried by the removable lens cone, as more fully described in my Patent Number 1,612,860, above referred to.

The removable magazine carries the sensitive film or plates, as previously stated, and also houses the changing machanism, that is, the means by which the plate or film is carried out of the focal plane or exposure field after each exposure and by which a fresh plate or film is brought into the field for the next exposure. In the particular magazine hereinafter described, the photographic medium on which the image is projected by the lens is a flexible film. The driving mechanism, carried by the camera body 10, actuates the changing mechanism at appropriate times, and they also actuate or control the shutter (not shown) carried by the lens cone 13. Releasable connections are provided between the changing mechanism and the driving mechanism, as more fully described hereinafter.

The film magazine 12 has a flat bottom provided with a rectangular exposure opening 110 (see Fig. 11) to register with a corresponding opening (not shown) in the top of the camera body 10. The exposure opening 110 may be closed by a dark slide 111. The magazine is detachably secured to the camera body by means of flanges 112, 113, the first to cooperate with a fixed overhanging clip (not shown) on the camera body, and the other to cooperate with a diagonally sliding clip at 114 of conventional construction, fastened on the camera body by means of screws 116 extending through inclined slots in the clip, as will be readily understood.

The magazine cover, 12a, is removable and is provided with end flanges, as 12b, Fig. 2, engaging flanged members 12c on the edges of the end walls to provide light-tight joints thereat. Any suitable locking means, as for example sliding latches, indicated at 12d and actuated by external knobs 12e, Figs. 4 and 5, may be provided to hold the cover in place but permit the same to be lifted off, when desired, for loading the magazine and for other purposes.

Figure 1:
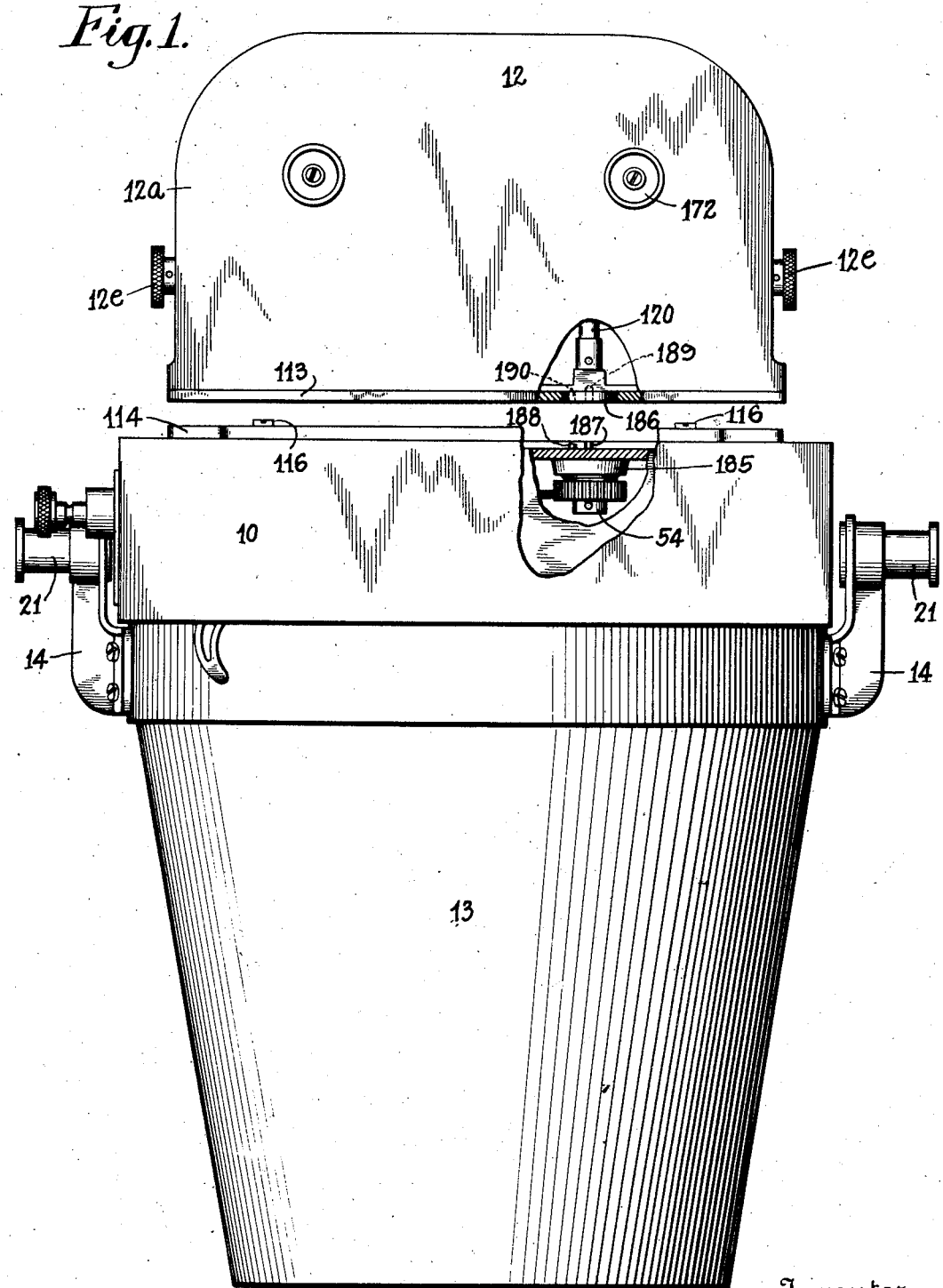
Fig. 1 is an elevational view of the camera, with the film magazine detached and raised sightly above the camera body.
Figure 3:
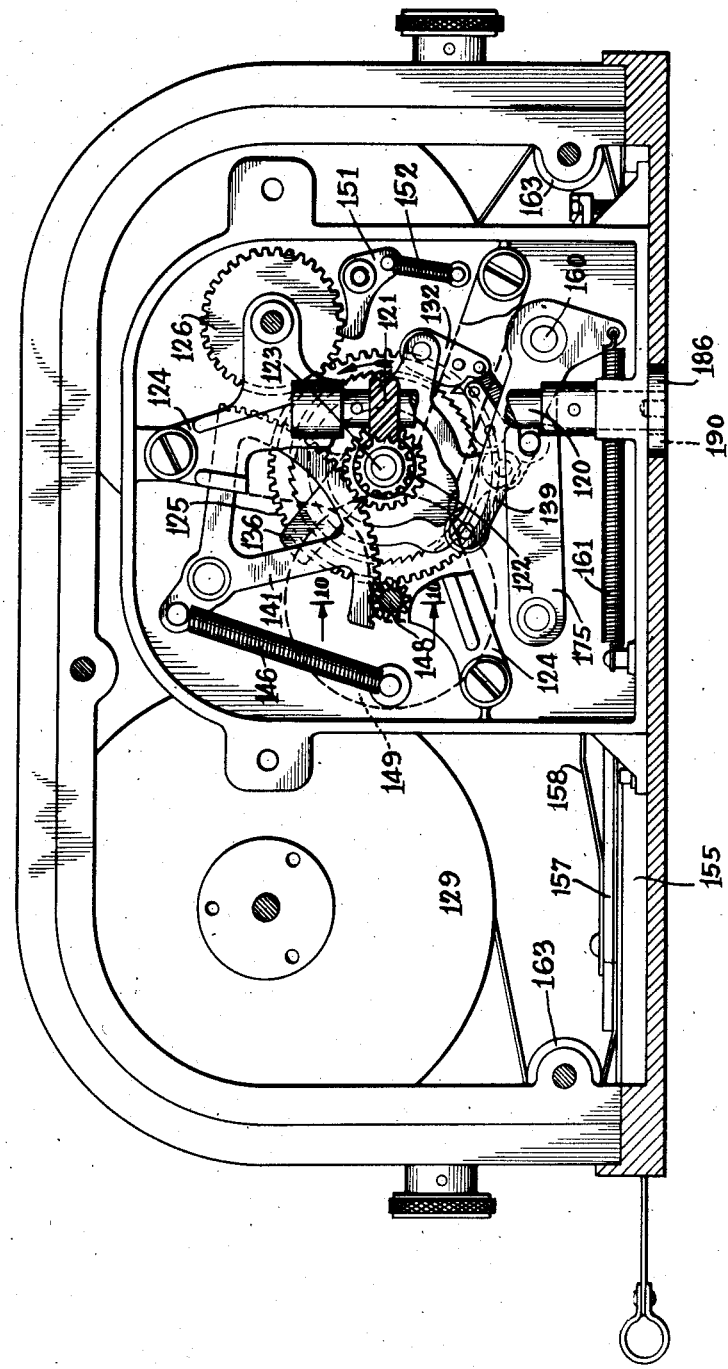
Fig. 3 is an end-sectional view of the magazine on line 3—3 of Fig. 2.

Motion from the driving mechanism in the camera body 10 is communicated (through a releasable connection hereinafter described) to the magazine driving shaft 120, Figs. 1, 2 and 3, provided with a spiral gear 121 which meshes with a corresponding gear 122 on the transverse shaft 123, Figs. 6 and 8. The gear 122 is adjacent to the support 124, in which said shaft is mounted. See Figs. 2, 3 and 8. Loose on the inner end of shaft 123 is a large gear 125, Fig. 4, meshing with a gear 126 on the film spindle 127 which engages the film take-up spool 128 in the usual manner to rotate the latter and thus draw film from the supply spool 129, Fig. 3. It will therefore be seen that the take-up spool will be rotated whenever the gear 125 is operatively connected with the rotating shaft 123. This connection is effected at appropriate times in the following manner.

Fixed on shaft 123, Figs. 3, 4, 6, 8, is a driving plate 130 carrying a pivoted pawl 131 (see also Figs. 7 and 9) and a pivoted latch 132 connected by a contractile spring 133 which tends to swing both these members toward the ratchet 134 loose on the shaft but fixed to the film-driving gear 125. This action, however, is prevented by the engagement of the pointed end of the said pawl 131 in the notch 135 of the latch, Fig. 6. Consequently the driving plate and the pawl and latch can revolve (with shaft 123) without actuating the ratchet; but when the latch, moving in the direction of the arrow, Figs. 3 and 6, reaches the inclined end of arm 136 (described hereinafter) the stud 137 on the latch (Fig. 7) is cammed outwardly, thereby swinging the latch in the same direction and consequently disengaging the latch from the pawl 131, as in Fig. 4. The pawl is then swung into engagement with the ratchet, which is thereby rotated in the direction of the arrow. This movement continues until the release-plate 138 (Fig. 7) on pawl 131 meets the roller on the end of arm 139 (described hereinafter), which throws the pawl out of engagement with the ratchet and carries its pointed end again into the locking notch 135, Fig. 6. The film-feed ceases at once, but of course the driving plate 130 (carrying the driving pawl) continues to revolve until the shaft 123 is itself arrested.

The arm 139, which, as described above, disengages the driving pawl 131 from the driving ratchet 134, is itself pivoted, but is always in the same position when it performs the function stated, and hence the film-feeding operation always ceases at the same point in the cycle; and inasmuch as the film-feed begins when the latch 132 engages the arm 136, it will be evident that the extent of the rotation imparted to the gears 125 and 126, and hence the amount of film drawn off the supply spool, will depend upon the position of the arm 136. Accordingly the position of the latter is determined by the diameter of the roll of film on the take-up spool, in such manner that the variable extent of rotation imparted to the take-up spool will always be sufficient to draw the same length of film from the supply spool. For this purpose the said arm 136 (Figs. 3 and 8) is mounted loosely on shaft 123 but is connected rigidly to a gear 140 meshing with a sector 141 fixed on a rock shaft 142 on which is fixed, at its other end, an arm 143 (Figs. 2, 4 and 5) carrying a roller 144 held against the roll of film 145 on the take-up spool by a spring 146. Evidently, if the take-up spool is empty the film-measuring sector 141 is swung to its extreme rightward position (Fig. 3) thereby positioning the measuring arm 136 also in the extreme rightward position, with the result that the driving pawl 131 will pick up the ratchet 134 at a point relatively remote from the point at which the two are disengaged, and accordingly the take-up spool will be given its maximum rotation. As the take-up spool fills, the arm 143 is swung back and the arm 136 is retracted, thus causing the pawl to pick up the ratchet later and later and hence give the spool correspondingly less movement; but inasmuch as the lessened movement of the spool is always proportional to the increased diameter of the roll of film on the spool, the amount or length of film wound onto the spool at each movement thereof is substantially constant.

As will be seen from the above, the position of the sector 141, Fig. 3, depends upon the number of unit-lengths of film which have been wound on the take-up spool. Advantage is taken of this fact to indicate the number of such lengths that have been wound on the spool. For this purpose a pinion 148 is provided (Fig. 3), to mesh with the sector and carrying a dial 149, Figs. 2 and 10, which may bear suitable numbers or other characters visible through a window 150 in the end of the magazine casing.

Backward rotation of the take-up film-spool, with consequent looseness of the film and in some cases incorrect spacing thereof, is prevented by a holding pawl 151, Fig. 4, held in engagement with gear 126 of a spring 152.

To position the film accurately in the focal plane or exposure field, there is provided in the exposure opening 110 of the magazine (Fig. 11) a glass position-plate 155 (removably held by the strips 156) upon which the film is firmly pressed by the yielding pressure of a plate 157 carried by the springs 158 which are in turn carried by the fingers 159, Figs. 11 and 12. The arms mentioned are mounted on a rockshaft 160, to one end of which the arm 139, Fig. 4, is fixed. The arm 139 is urged clockwise by a spring 161, which holds the roller (carried by the free end of the arm) against the cam 162 (shown also in Fig. 6) fixed on shaft 123 and so positioned thereon that the rise on the cam will engage and rock the arm downwardly (as in Fig. 3) at the proper instant after the film-feed is stopped by the said arm 139. This movement of the arm rocks shaft 160, which swings the fingers 159 down (Figs. 11 and 12) thereby pressing the plate 157 down upon the film and holding the latter firmly against the upper surface of the glass position-plate 155. The timing of the cam 162 is such that pressure occurs before the exposure, continues during the exposure, and is relieved (by the rise on the cam passing the roller on the pressure arm 139) before the succeeding feeding movement of the film begins. When the rise on the cam passes the pressure arm the spring 161 swings the latter up and thus raises the pressure plate. Preferably the parts involved are so proportioned that this upward movement of the plate is sufficient to bring it well above the lower edges of the film guide-rollers 163, Figs. 3 and 11, which are themselves well above the glass position plate 155; so that when the film is in motion (during the feeding operation) it will be out of contact with both plates 155 and 157 and hence will not be scratched thereby.

It will be observed that although the pressure plate 157 is positively actuated, the pressure exerted by the arms 159 is communicated to the plate by the springs 158, which are independent of each other, so that if the actuating arms mentioned happen not to be in accurate angular alignment on the shaft 160 and hence do not approach the position-plate 155 uniformly when the shaft is rocked the pressure plate can adjust itself and press the film snugly on the position-plate without danger of exerting materially greater pressure on one part of the latter than on another. Breakage of the position-plate is thus virtually eliminated.

The arms or fingers 159, Fig. 12, which carry the pressure plate 157, are not fixed on the actuating shaft 160, but are mounted on sliding sleeves 164 and are provided with studs 165, 166 engaging corresponding apertures in the spring yokes 167 and arms 168, the latter being pinned on the shaft. The sleeves 164 are urged outwardly on the shaft by a coil spring 169, which serves to hold the studs mentioned in their respective apertures, whereby rocking of the shaft will raise and lower the pressure plate as previously described. The sleeves are provided at their inner ends with finger pieces 170. When these are grasped and pressed toward each other the sleeves are shifted toward each other, bringing the arms 159 to the positions shown in dotted lines, wherein the studs 165, 166 are disengaged from the yokes 167 and arms 168. The pressure plate 157 can now be removed for cleaning and for access to the upper surface of the position plate 155 for cleaning or replacement.

As so far described, the feeding of the film is effected automatically by the shaft 120 (Fig. 3) which is rotated by the shaft 54, Fig. 1, which is itself rotated by the driving mechanism, not shown, in the camera body 10. The film may, however, be advanced manually by grasping and turning the knob 172 (Fig. 2) which is fixed on the end of the film spindle 127 (Fig. 4), the operator noting the amount of film wound onto the take-up spool by observing the dial 149 through the window 150. This manual film-feed is permitted, without interfering with the automatic feed, by the fact that the gear 125 is loose on shaft 123 and that ratchet 134 is normally disengaged from pawl 131.

The magazine also carries means for marking the film at points adjacent to the exposed area, so that the film may be cut up safely, if desired, for development. For this purpose the swinging arm 175, Fig. 4, is provided, having in its free end a recess to engage an actuating stud 176 on the arm 139, which, it will be remembered, actuates the pressure plate 157. On the other end of the stud 177, on which the member 175 is fixed, is an arm 178, Fig. 5, carrying a punch 179 between the adjacent guide roller 163 and the edge of the pressure plate 157. It will therefore be seen that whenever the pressure plate is depressed the punch will also be actuated to mark the film, as by perforating or indenting it, outside of the exposure area or field.

In order that the film-changing mechanism in the magazine 12 and the driving mechanism in the camera body 10 may operate in harmony, so that the cycles of the two will have the proper time relation, the detachable or releasable operating connection between the mechanisms is constructed to permit engagement only at the proper relation. For this purpose the two shafts 54, 120, Figs. 1 and 3, are provided with clutch disks 185, 186, respectively, the latter having a centering pin 187 and a driving pin 188 to enter a centering aperture 189 and driving aperture 190

190 in the other. The driving stud and driving aperture being properly located to give the correct timing in their respective mechanisms it will be seen that the two mechanisms are synchronized; in other words, they cannot be operatively connected except in the proper time relation. Inasmuch as the magazine can be loaded without interference with the feeding mechanism, the clutch disk 186 will, ordinarily, be found to be in position to engage at will with the other disk when the magazine is replaced on the camera body. If not, the magazine clutch disk can be turned by means of a suitable spanner or other tool, not shown, to bring it in position to match with the other disk, or the latter can be turned to match the first by sufficient movement of a suitable hand crank. Or the driving stud may be constructed to yield downwardly if, when the magazine is placed on the camera body, the driving aperture in the magazine clutch disk does not match with the stud. Then when the driving mechanism is actuated, by its motor or hand crank (not shown) the revolving stud will eventually find the aperture, whereupon it will snap up into the same. The two mechanisms are thus synchronized as before.

It is to be understood that the invention is not limited to the specific construction herein illustrated and described but can be embodied in other forms without departure from its spirit.

I claim—

1. In an aerial camera having an exposure plane in which a film positioning plate is arranged, film-feeding means, film guide rollers adjacent to said plane to determine the plane of movement of the film, and a pressure-plate adapted to press the film on said film positioning plate into the exposure plane, and movable from the exposure plane through the movement plane of the film to permit feeding movement of the film without contact with the pressure plate, means for actuating said pressure plate comprising a plurality of elements positively actuated by said feeding mechanism and directly connected to said pressure plate by pressure resisting resilient members.

2. In an aerial camera having an exposure plane, a transparent positioning plate between the camera lens and the exposure plane and having its rear surface at said plane, means for feeding a film across the exposure plane, film guide rollers adjacent to the positioning plate to maintain the film out of contact therewith while the film is in motion, a pressure-plate movable between said rollers to press the film upon the positioning plate, and actuating mechanism comprising a plurality of elements positively actuated by said feeding mechanism and directly connected to said pressure plate by pressure resisting resilient members operating in harmony with the film-feeding means to press the pressure plate upon the film after each feeding movement and hold the pressure plate out of contact with the film during each feeding movement.

3. In an aerial camera having an exposure plane, a transparent positioning plate between the camera lens and the exposure plane and having its rear surface at said plane, means for feeding a film across the exposure plane, film guide rollers adjacent to the positioning plate to maintain the film out of contact therewith while the film is in motion, a pressure-plate movable between said rollers to press the film upon the positioning plate, actuating mechanism operating in harmony with the film-feeding means to press the pressure plate upon the film after each feeding movement and hold the pressure plate out of contact with the film during each feeding movement, and means comprising a plurality of elements positively actuated by said feeding mechanism and directly connected to said pressure plate by pressure resisting resilient members operating in harmony with the said pressure-plate actuating mechanism to mark the film adjacent to the exposure area thereof at each pressing movement of the plate.

4. In an aerial camera, a film feeding mechanism, a transparent film positioning plate, a self-adjusting pressure plate adapted to cooperate therewith to hold a flexible film at the exposure plane of the camera, and means for actuating the pressure plate, said means comprising a plurality of elements positively actuated by said feeding mechanism and directly connected to said pressure plate by pressure resisting resilient members.

5. In an aerial camera, a film compartment, film feeding mechanism associated therewith, a transparent film positioning plate, a pressure plate to press the film on the positioning plate, means for actuating the film feeding mechanism, means for actuating said pressure plate in harmony with said feeding mechanism, said last named means comprising a plurality of elements positively actuated by said feeding mechanism and directly connected to said pressure plate by pressure resisting resilient members, said means also including a releasable connection with the pressure plate to permit the removal of the latter at will.

6. In an aerial camera, a film compartment having an exposure opening and a film positioning plate therefor, film feeding mechanism associated with the film compartment, a pressure plate adapted to cooperate with said positioning plate to press the film over the exposure opening, means for actuating the film feeding mechanism, means for actuating said pressure plate in harmony with said feeding mechanism, said last named means comprising a plurality of elements positively actuated by said feeding mechanism and directly connected to said pressure plate by pressure resisting resilient members.

7. In an aerial camera, a film magazine having film feeding mechanism, a transparent film positioning plate, a pressure plate to press the film on the positioning plate, means for actuating the film feeding mechanism, and means for actuating said pressure plate in harmony with said feeding mechanism, said means comprising a plurality of elements positively actuated by said feeding mechanism and directly connected to said pressure plate by pressure resisting resilient members, said means also including a releasable connection with the pressure plate to permit removal of the latter at will.

8. In an aerial camera, a removable film magazine having an exposure opening and a film positioning plate therefor, mechanism for feeding a strip of film step by step across the exposure opening, a movable pressure plate in the rear of the path of the film and adapted to cooperate with said film positioning plate to press the film over the exposure opening, and pressure plate actuating means comprising a plurality of elements positively connected with the film feeding mechanism and connected to said pressure plate by pressure resisting resilient members to actuate the pressure plate in harmony with the movement of the film, and carrying means for the pressure plate releasably connected with the actuating means to permit the removal of the pressure plate at will.

9. In an aerial camera, a removable film magazine having an exposure opening, a transparent film positioning plate associated with said opening, mechanism for feeding a strip of film step by step across the exposure opening and in rear of said film positioning plate, a pressure plate in rear of the path of the film to press the film against the positioning plate, pressure plate actuating means comprising a plurality of elements connected with the film feeding mechanism and directly connected to said pressure plate by pressure resisting resilient members to actuate the pressure plate in harmony with the movement of the film, and carrying means for the pressure plate releasably connected with the actuating means to permit removal of the pressure plate at will.

10. In an aerial camera, a film magazine having an exposure opening, mechanism for feeding the film step by step across the exposure opening, a transparent film positioning plate at the exposure opening, a self-adjusting pressure plate to press the film upon the positioning plate, and means operable in harmony with the feeding mechanism to actuate the pressure plate, said means comprising a plurality of elements positively actuated by said feeding mechanism and directly connected to said pressure plate by pressure resisting resilient members.

11. In an aerial camera having an exposure plane, a film feeding mechanism, a film positioning plate, a pressure plate adapted to cooperate therewith for pressing the film toward the exposure plane, a transparent positioning plate to arrest and hold the film at the exposure plane under the pressure of the pressure plate, actuating means for the pressure plate, said means comprising a plurality of elements positively actuated by said feeding mechanism and directly connected to said pressure plate by pressure resisting resilient members.

12. In an aerial camera, a film feeding mechanism, a transparent film positioning plate, a self-adjusting pressure-plate adapted to cooperate therewith to hold said flexible film at the exposure plane of the camera, and means controlled by said film feeding mechanism for actuating said pressure plate.

13. In an aerial camera, a film compartment, film feeding mechanism associated therewith, a transparent film positioning plate, a pressure plate to press the film on the positioning plate, and means actuated by said film feeding mechanism for operating said pressure plate in harmony with the feeding of the film and the operation of the shutter of said camera, said means including a releasable connection with the pressure plate to permit the removal of the latter at will.

14. In an aerial camera, a film compartment having an exposure opening, and a film positioning plate arranged thereover, a film feeding mechanism associated with the film compartment, a pressure plate to press the film on said film positioning plate over the exposure opening, means for actuating the film feeding mechanism and means operated thereby for actuating said pressure plate in harmony with said feeding mechanism, said means including a releasable connection with the pressure plate to permit the removal of the latter at will.

15. In an aerial camera, a film magazine having film-feeding mechanism, a transparent film-positioning plate, a pressure-plate to press the film on the positioning plate, means for actuating the film-feeding mechanism and means operated thereby for actuating pressure-plate in harmony with said feeding mechanism, said means including a releasable connection with the pressure-plate to permit removal of the latter at will.

16. In an aerial camera, a removable film magazine having a film positioning plate extending over the exposure opening thereof, mechanism for feeding a strip of film step by step across the exposure opening, a movable pressure-plate in the rear of the path of the film to press the film over the exposure opening, and pressure-plate actuating means operated by said film feeding mechanism to actuate the pressure-plate in harmony with the movement of the film, and carrying means for the pressure-plate releasably connected with the actuating means to permit the removal of the pressure-plate at will.

17. In an aerial camera, a removable film magazine having a film positioning plate covering the exposure opening thereof, mechanism for feeding a strip of film step by step across the exposure opening, a pressure-plate in the rear of the path of the film to press the film on said film positioning plate over the exposure opening, and pressure-plate carrying and actuating means operated by said film feeding mechanism to actuate the pressure-plate in harmony with the movement of the film.

18. In an aerial camera, a removable film magazine having an exposure opening, a transparent film-positioning plate associated with said opening, mechanism for feeding a strip of film step by step across the exposure opening and in rear of said film-positioning plate, a pressure-plate in rear of the path of the film to press the film against the positioning plate, pressure-plate actuating means operated by said film-feeding mechanism to actuate the pressure-plate in harmony with the movement of the film, and carrying means for the pressure-plate, releasably connected with the actuating means to permit removal of the pressure plate at will.

19. In an aerial camera, a film compartment having a transparent film positioning plate covering the exposure opening, means for feeding a flexible film step by step across the exposure opening, a pressure-plate to hold the film on said film positioning plate at the exposure opening thereof in the focal plane of the camera, and means operated by said film feeding means to bring the pressure-plate into contact with the film after each feeding movement of the film and carry the plate out of contact with the film before the next feeding movement begins.

20. In an aerial camera having an exposure opening with a film positioning plate therefor, means for passing a flexible film step by step across the exposure opening, transverse film-guiding devices adjacent to the exposure opening arranged at opposite ends thereof and determining the plane in which the film moves, a pressure-plate movable between said guiding devices to press said film on said film positioning plate to position the film at the exposure opening, and means operated by said film-feeding means to hold the pressure-plate out of contact with the film during the feeding movement of the latter.

21. In an aerial camera having a film positioning plate arranged at the exposure plane of said camera, film-feeding means, film guide rollers adjacent to said plane to determine the plane of movement of the film, and a pressure-plate adapted to press the film on said film positioning plate and into the exposure plane, and movable under control of said feeding mechanism from the exposure plane through the movement plane of the film to permit feeding movement of the film without contact with the pressure-plate.

22. In an aerial camera having an exposure plane, a transparent positioning plate between the camera lens and the exposure plane and having its rear surface at said plane, means for feeding a film across the exposure plane, film guide rollers adjacent to the positioning plate to maintain the film out of contact therewith while the film is in motion, a pressure-plate movable between said rollers to press the film upon the positioning plate, and actuating mechanism operated by said film-feeding means to press the pressure plate upon the film after each feeding movement and hold the pressure plate out of contact with the film during each feeding movement.

23. In an aerial camera having an exposure plane, a transparent positioning plate between the camera lens and the exposure plane and having its rear surface at said plane, means for feeding a film across the exposure plane, film guide rollers adjacent to the positioning plate to maintain the film out of contact therewith while the film is in motion, a pressure-plate movable between said rollers to press the film upon the positioning plate, actuating mechanism operated by said film-feeding means to press the pressure-plate upon the film after each feeding movement and hold the pressure-plate out of contact with the film during each feeding movement, and means operating in harmony with the said pressure-plate actuating mechanism to mark the film adjacent to the exposure area thereof at each pressing movement of the plate.

24. In an aerial camera, a film magazine having an exposure opening, mechanism for feeding the film step by step across the exposure opening, a transparent film-positioning plate at the exposure opening, a self-adjusting pressure-plate to press the film upon the positioning plate, and means operated by said feeding mechanism to actuate the pressure plate.

25. In an aerial camera having an exposure plane, a pressure-plate for pressing the film toward the exposure plane, a transparent positioning plate to arrest and hold the film at the exposure plane under the pressure of the pressure-plate, means operated by said feeding mechanism for actuating said pressure-plate, and a yielding connection between the pressure-plate and said actuating means to permit self-adjustment of the pressure-plate in pressing the film upon the positioning plate.

26. In an aerial camera, an exposure opening and a film positioning plate arranged thereover, a film feeding mechanism, a film pressure-plate adapted to press the film on said plate, an actuating shaft, means operated by said feeding mechanism for rocking the shaft, actuating arms carried by the shaft, and spring means connecting the pressure-plate and said arms.

27. In an aerial camera, an exposure opening and a film positioning plate arranged thereover, a film feeding mechanism, a rock shaft having axially spaced arms, a film pressure-plate adapted to press the film on said plate, and releasable means connecting the pressure-plate to said arms for actuation thereby, and said rock shaft being operated by said feeding mechanism.

28. In an aerial camera, an exposure opening and a film positioning plate arranged thereover, a film feeding mechanism, a rock shaft having axially spaced arms and adapted to be operated by said film feeding mechanism, fingers slidable on the shaft between said arms and adapted to engage the said arms for actuation thereby, yielding means normally holding the fingers separated from each other and in engagement with said arms but permitting disengagement therefrom by sliding movement of the fingers toward each other on the shaft, and a film pressure-plate for pressing the film on said film positioning plate and adapted to be releasably engaged by the fingers.

29. In an aerial camera, an exposure opening and a film positioning plate arranged thereover, having a film feeding means and a shutter operating means, both of said means including mechanism so interdependently related as to predetermine the sequence of a series of operations thereof, a pressure-plate is adjustable in different vertical and horizontal planes and adapted to hold a flexible film on said film positioning plate at the exposure plane of said camera, means positively driven by said film feeding means for actuating said pressure-plate at predetermined intervals regulated by the operation of the remaining mechanism of said camera, to intermittently force the said pressure-plate against said film and to release said pressure-plate therefrom.

In testimony whereof I hereto affix my signature.

SHERMAN M. FAIRCHILD.